(12) United States Patent
Allen et al.

(10) Patent No.: US 9,169,767 B2
(45) Date of Patent: Oct. 27, 2015

(54) DEVICE FOR AT LEAST PARTIALLY BLOCKING AN OPENING AND FORMING A SEAL IN THE OPENING

(71) Applicants: David Mark Allen, St. Louis, MO (US); Scott Allen Sanders, Arnold, MO (US)

(72) Inventors: David Mark Allen, St. Louis, MO (US); Scott Allen Sanders, Arnold, MO (US)

(73) Assignee: LINCOLN INDUSTRIAL CORPORATION, St. Louis, MO (US)

( * ) Notice: Subject to any disclaimer, the term of this patent is extended or adjusted under 35 U.S.C. 154(b) by 115 days.

(21) Appl. No.: 13/942,804

(22) Filed: Jul. 16, 2013

(65) Prior Publication Data

US 2015/0021862 A1    Jan. 22, 2015

(51) Int. Cl.
*F16L 37/05* (2006.01)
*F01P 11/02* (2006.01)

(52) U.S. Cl.
CPC ............. *F01P 11/0204* (2013.01); *F16L 37/05* (2013.01)

(58) Field of Classification Search
CPC ......... F16L 37/04; F16L 37/05; F16L 21/007; F16L 55/132
USPC ......... 285/109, 100, 101, 104, 105, 196, 346, 285/338, 214
See application file for complete search history.

(56) References Cited

U.S. PATENT DOCUMENTS

| | | | | |
|---|---|---|---|---|
| 491,184 | A * | 2/1893 | McCartney | 138/89 |
| 1,108,313 | A * | 8/1914 | Anderson | 285/338 |
| 1,297,113 | A * | 12/1918 | Domenico | 73/49.8 |
| 1,993,307 | A * | 3/1935 | Nicholson | 285/338 |
| 2,299,434 | A * | 10/1942 | Svirsky | 138/90 |
| RE23,748 | E * | 12/1953 | Barber | 285/338 |
| 2,668,511 | A * | 2/1954 | Eberle et al. | 228/50 |
| 3,048,428 | A * | 8/1962 | Ransom | 285/338 |
| 3,568,721 | A * | 3/1971 | Ross et al. | 138/97 |
| 4,225,159 | A * | 9/1980 | Van Meter | 285/338 |
| 6,152,193 | A | 11/2000 | Klamm | |
| 6,234,215 | B1 | 5/2001 | Klamm | |
| 6,360,790 | B1 | 3/2002 | Klamm | |
| 8,534,715 | B2 * | 9/2013 | Abbasi et al. | 285/338 |
| 2004/0074549 | A1* | 4/2004 | Allen | 138/89 |

OTHER PUBLICATIONS

Air Lift—Automotive Topics, http://www.crookedriverwriter.com/index.php?/Automotive-Topics/air-lift.htm retrieved Jul. 15, 2013.

* cited by examiner

*Primary Examiner* — David E Bochna
(74) *Attorney, Agent, or Firm* — J-Tek Law PLLC; Jeffrey D. Tekanic; Scott T. Wakeman

(57) ABSTRACT

A device for at least partially blocking an opening includes a first body, a second body rotatably mounted to the first body and a compressible seal extending from the first body. The seal includes a first portion, a plate having a hole at one end of the first portion, and a second portion extending away from the plate. A hollow shaft extends from the second body and through the first body, the first portion, the hole in the plate, and into the second portion. The shaft has a shoulder in the second portion that is wider than the hole in the plate, and moving the shaft relative to the first body compresses the second body until the shoulder reaches the plate and then compresses the first body. Such compression expands the first and/or second portions and presses them against the inside of the opening to form a seal.

21 Claims, 8 Drawing Sheets

DEVICE FOR AT LEAST PARTIALLY BLOCKING AN OPENING AND FORMING A SEAL IN THE OPENING

FIELD OF THE INVENTION

The present invention is directed to a device for at least partially blocking an opening and for forming a seal inside the opening, and, more specifically, toward an adapter having a compressible seal with first and second differently sized sections for forming a seal inside openings of different sizes.

BACKGROUND OF THE INVENTION

It is often desirable to form a seal with an inside wall of an opening or a tube. This may be done to completely block or plug the opening, or tube or to connect an adapter or similar structure to the opening or tube. For example, one method of filling a vehicle radiator requires establishing a partial vacuum in the radiator. This is done by inserting an adapter into the radiator filler neck, forming a seal between the adapter and the inside wall of the filler neck and using a pump to remove air from the radiator through the adapter. An opening in the adapter is then connected to a source of clean radiator fluid, and the pressure difference between the inside of the radiator and ambient pressure forces the clean radiator fluid into the radiator.

Conventional adapters for filling vehicle radiators generally include a flexible seal member that is insertable into the radiator filler neck, a shaft that extends through the flexible seal member, and two bodies at one end of the seal member that are connected to one another by screwthreads. The shaft is connected to one of the bodies, extends through the other body and the seal member and is connected to the seal member. Starting with the two bodies screwed together, the flexible seal member is inserted into the filler neck, and the bodies are then screwed apart from one another. This action moves the top of one body away from the bottom of the other body, pulls the shaft toward the bodies and compresses the seal member. Such compression of the seal member causes the outer wall of the seal member to bulge and press against the inside wall of the tube. As the bodies are unscrewed further, the connection between the sidewall and the seal member becomes tighter, and a fluid-tight seal with the tube sidewall is formed.

Filler necks can vary widely in diameter. A tapered flexible seal member may allow a single adapter to be used in finer necks having a small range of diameters. However, multiple adapters generally must be provided to cover the full range of filler neck diameters that are present on automotive radiators today.

Using different adapters for filler necks having different diameters works adequately, but this requires purchasing and maintaining multiple adapters to cover the entire range of filler neck sizes that is likely to be encountered. It would be desirable to provide a device that forms a seal with the inside of an opening or a tube such as a filler neck that can be used with openings and tubes that have a wide range of diameters and which device can be sealed to and unsealed from the interior of the opening or tube in a simple manner.

SUMMARY OF THE INVENTION

These problems and others are addressed by embodiments of the present invention, a first aspect of which comprises an adapter configured to be mounted in an opening to form a seal with an interior wall of the opening. The adapter includes a first body, a second body rotatably mounted to the first body, and a compressible seal extending from the first body. The compressible seal includes a compressible seal first portion that has a first end at the first body, a second end and an interior, and the compressible seal further includes a plate having a hole at the second end of the compressible seal first portion. The compressible seal also includes a compressible seal second portion having a first end at the plate and a second end and having an interior, and a hollow shaft operably connected to the second body. The hollow shaft has a longitudinal axis and a shaft first end at the second body and a shaft second end, and the shaft projects through a passage in the first body, through the interior of the first portion of the compressible seal, through the hole in the plate, and into the interior of the second portion of the compressible seal. The shaft has a shoulder in the interior of the second portion of the compressible seal that is spaced from the plate and spaced from the second end, and a width of the shaft at the shoulder is greater than a width of the hole in the plate.

Another aspect of the present invention comprises a device for at least partially blocking an opening which device includes a first body and a compressible seal extending from the first body. The compressible seal includes a first portion having a first end at the first body and a second end spaced from the first body, and there is a wall having an opening at the second end of the first portion. The compressible seal further includes a second portion having a second portion first end at the first portion second end and a second portion second end. The device also includes a shaft having a first end and a second end and a longitudinal axis, and the shaft extends through the first body, through the first portion of the compressible seal and through the opening in the wall and into the second portion of the compressible seal. The shaft has a first part configured to move freely through the opening in the wall and a second part too large to pass through the opening in the wall, and the second part is located in the compressible seal second portion. The shaft is configured to support the compressible seal second portion. The device is configured so that shifting, the shaft second end a first amount toward the first body moves the shaft first part through the opening in the wall and pulls the compressible seal second portion second end toward the compressible seal second portion first end and radially bulges the compressible seal second portion. Shifting the shaft second end further toward the first body pulls the shaft second part against the wall having, the opening and pulls the wall having the opening toward the first body and radially bulges the compressible seal first portion.

A further aspect of the invention comprises a device for at least partially blocking an opening which device includes a first body, a second body rotatably mounted to the first body, and a compressible seal extending from the first body. The compressible seal includes a compressible seal first portion that has a first end at the first body, a second end and an interior. The compressible seal further includes a plate having a hole at the second end of the compressible seal first portion, and a compressible seal second portion having, a first end at the plate and a second end and having an interior. The device includes a hollow shaft operably connected to the second body that has a longitudinal axis and a shaft first end at the second body and a shaft second end. The shaft projects through a passage in the first body, through the interior of the first portion of the compressible seal, through the hole in the plate, and into the interior of the second portion of the compressible seal. The shaft has a shoulder in the interior of the second portion of the compressible seal, and the shoulder is spaced from the plate and is spaced from the second end, and a width of the shaft at the shoulder is greater than a diameter of the hole in the plate.

BRIEF DESCRIPTION OF THE DRAWINGS

These and other aspects and features of the present invention will be better understood after a reading of the following, detailed description together with the attached drawings, wherein.

DETAILED DESCRIPTION

Figure 1:
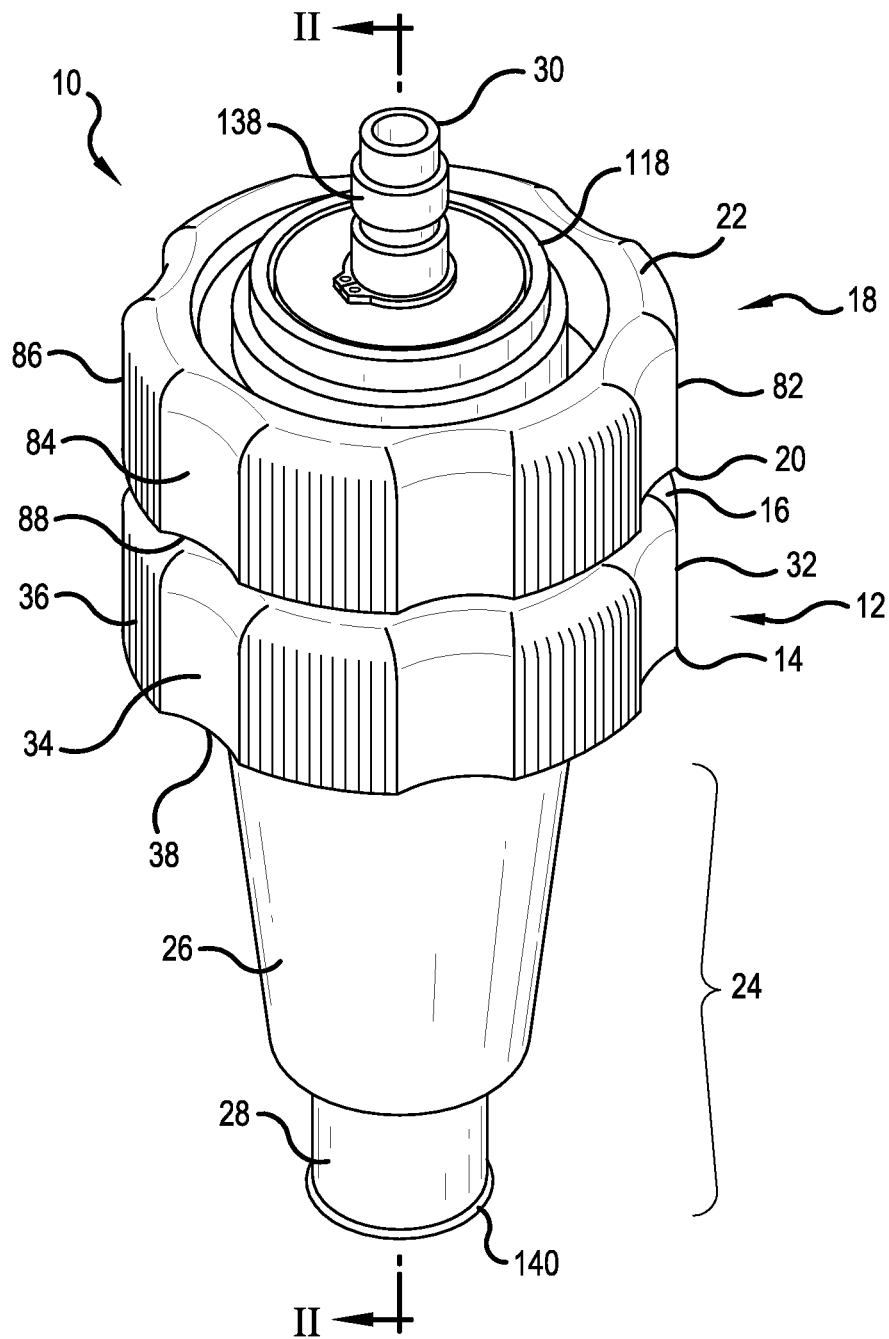
FIG. 1 is a perspective view of an adapter according to an embodiment of the present invention that includes two mutually rotatable bodies and a seal that has a cone-shaped portion and a cylindrical portion.

Referring now to the drawings, wherein the showings are for purposes of illustrating presently preferred embodiments of the invention only and not for the purpose of limiting same, FIG. 1 illustrates an adapter 10 that includes a first body 12 having a bottom 14 and a top 16, a second body 18 mounted on the first body 12 and having a bottom 20 and a top 22, and a seal 24 depending from the bottom 14 of the first body 12. The seal 24 includes a first portion 26 that is tapered and shaped like a truncated cone and a second portion 28 that is generally cylindrical. A hollow shaft 30 extends through the second body 18, the first body 12 and the seal 24.

Figure 7:
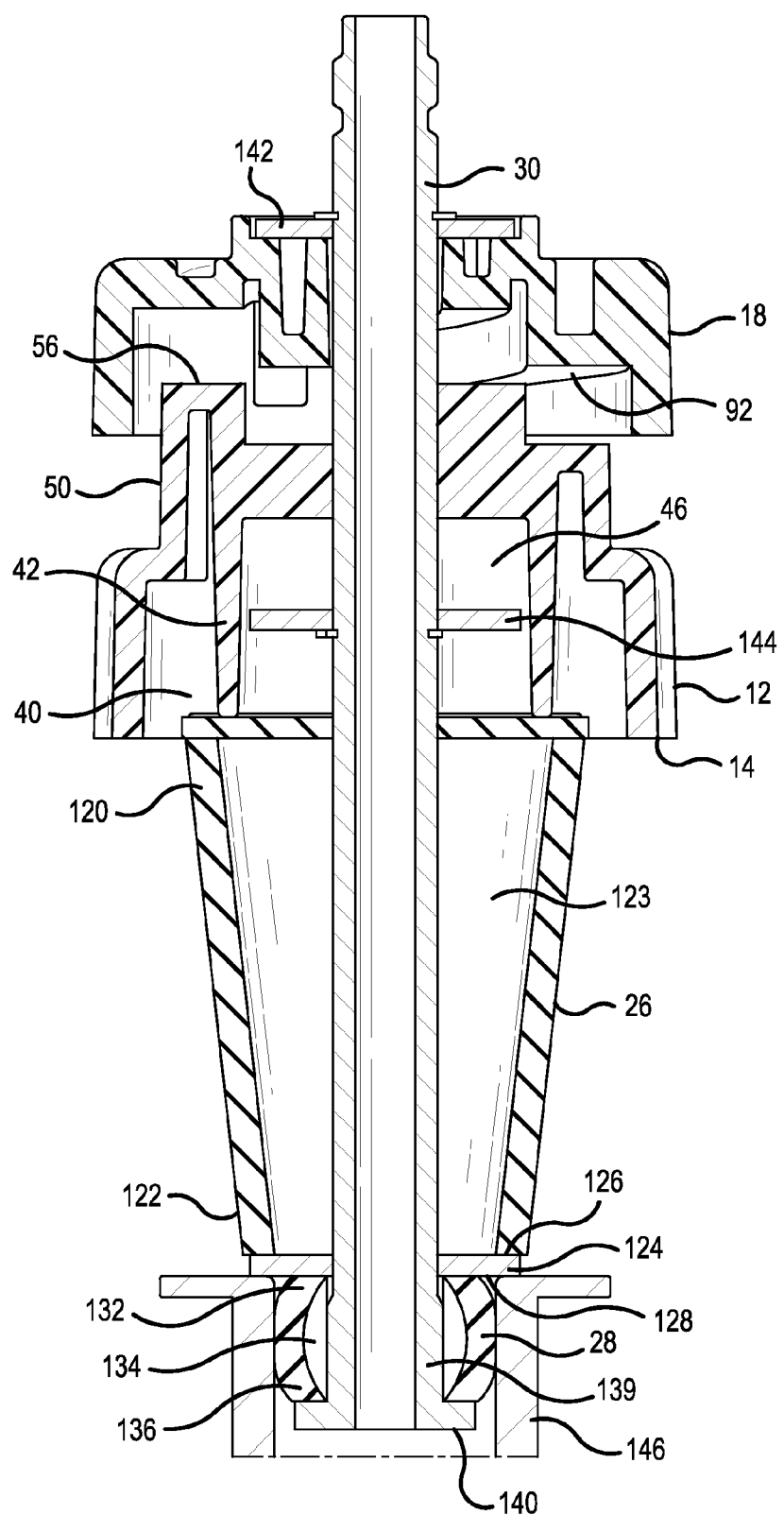
FIG. 7 is a sectional side devotional view of the adapter of FIG. 1 with the cylindrical portion of the seal inserted into a small tube and forming a seal with the interior of the small tube.
Figure 8:
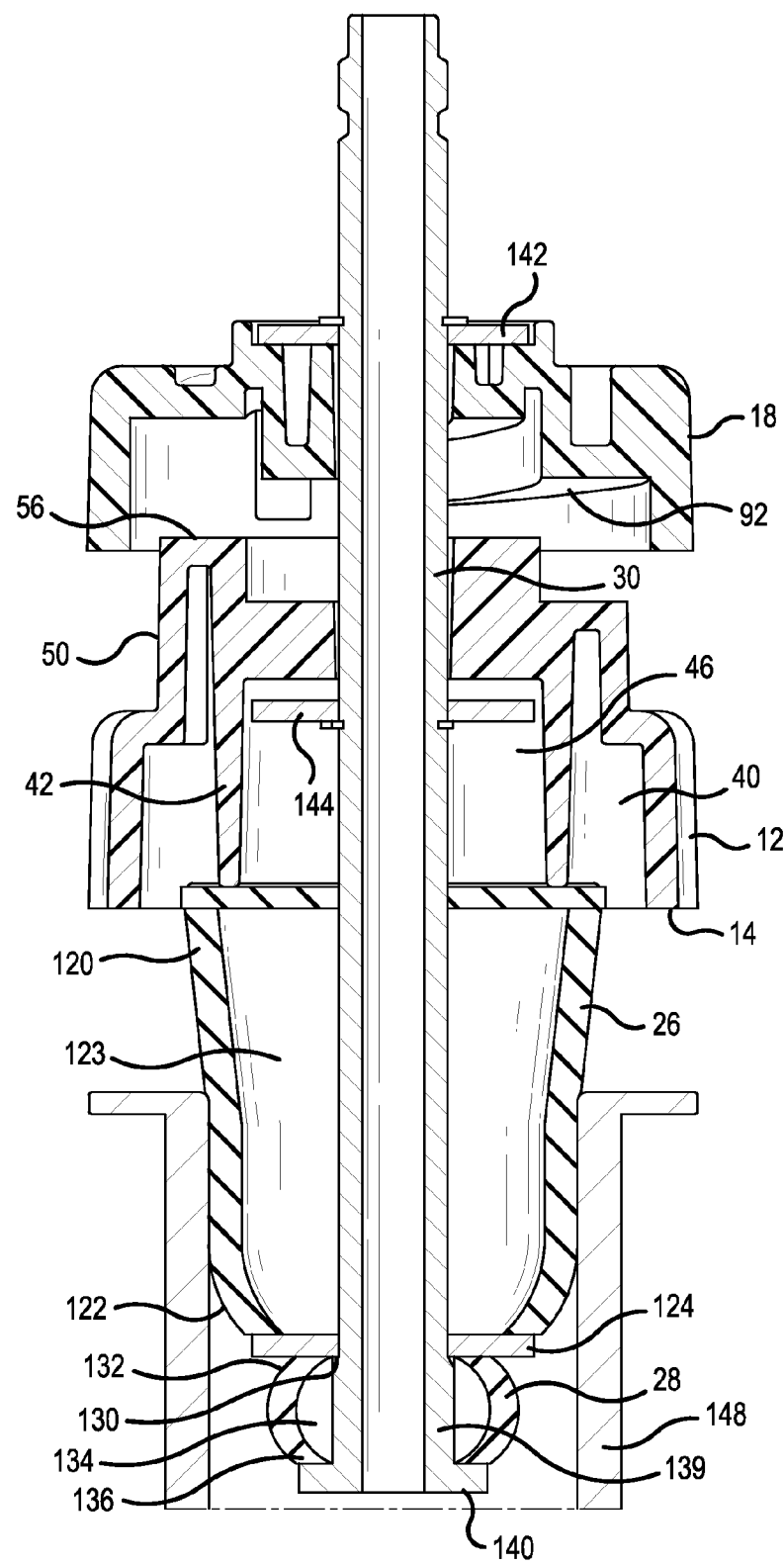
FIG. 8 is a sectional side elevational view of the adapter of FIG. 1 with the tapered or cone-shaped portion of the seal inserted into a large tube and forming a seal with the interior of the large tube.

This embodiment comprises an adapter 10 that allows a connection to be made between a hose (not illustrated) external to the adapter 10 and a filler neck, such as one of the filler necks 146, 148 of FIGS. 7 and 8, through the hollow shaft 30. A substantially similar device could be used as a stop or a plug, for a tube if the shaft 30 were blocked or if a non-hollow shaft were used in place of the hollow shaft 30. The present embodiment is directed primarily to an adapter 10, but a device for forming, a seal with an interior wall of an opening or a tube that does not include a hollow shaft and that does not adapt one element to another but instead serves solely as a closure or plug is also within the scope of the present invention. Moreover, while the disclosed embodiment is intended for use in a tubular filler neck of a radiator, it could also be used as a plug and/or an adapter in a passageway or opening in another structure, whether or not that structure comprises a tube.

The elements of the embodiments of the present invention many be described in terms of their orientation in the figures. An element that is located above another element in the figures, may, for example, be referred to a "top" or "upper" element while an element located below that element in the figures may be referred to as a "bottom" or "lower" element. It should be understood, however, that the device described herein can be used in any orientation, and in some orientations the element referred to as a "top" element may actually be located below a "bottom" element. This is done for convenience of explanation and is not intended to limit the disclosed device to use in any particular orientation.

Figure 2:
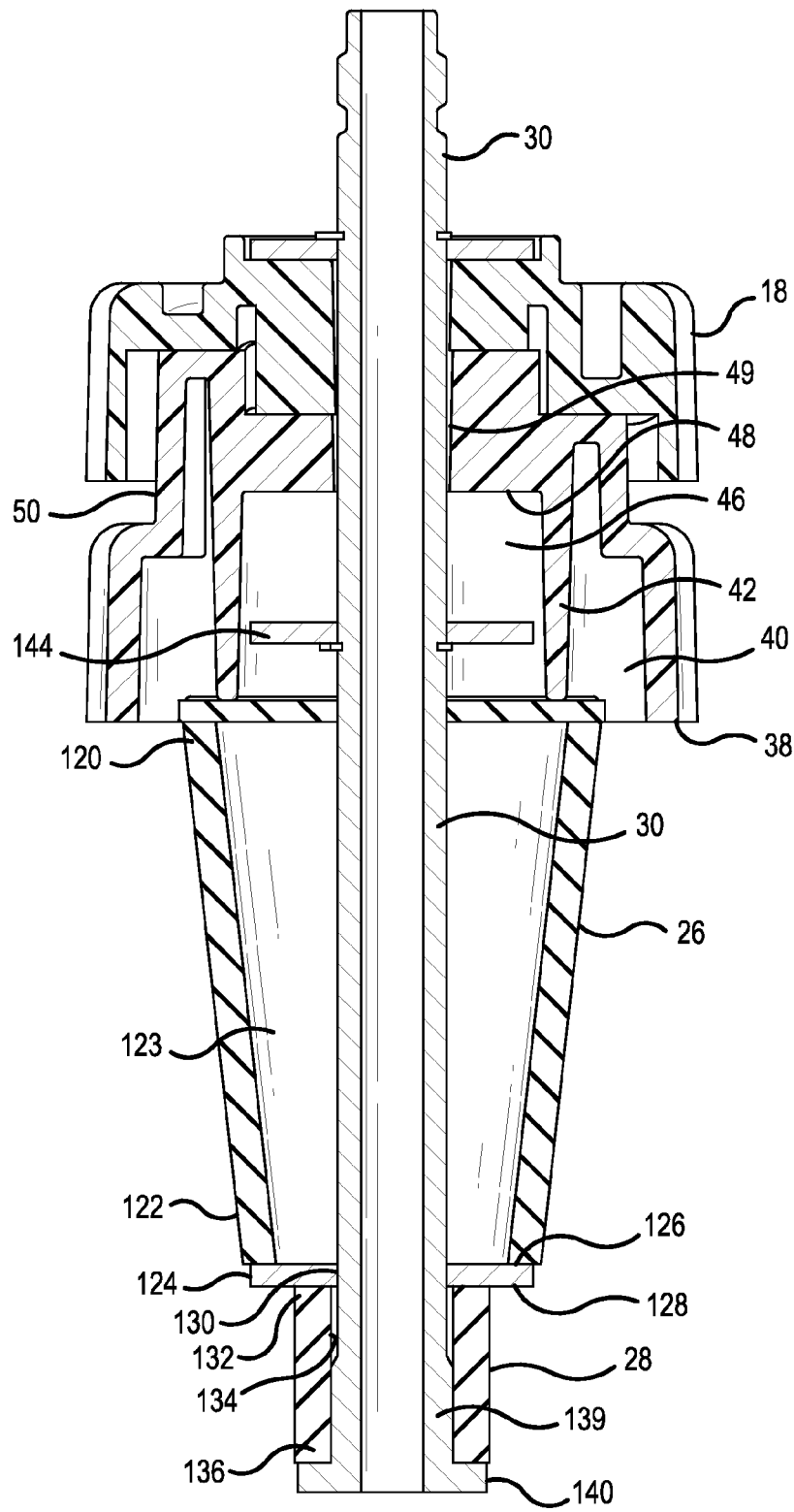
FIG. 2 is a sectional side devotional view taken along line II-II of FIG. 1.

The first body 12 includes a generally cylindrical outer wall 32 having indentations 34 and textured portions 36 that allow it to be securely grasped or turned by a user. The outer wall 32 at the bottom 14 of the first body 12 has a bottom edge 38 that defines a periphery of the first body 12 and a bottom entry into the interior 40 of the first body 12. As illustrated in FIG. 2, the interior 40 includes a depending wall 42 depending from an upper portion of the first body 12 and connected to the outer wall 32 by a plurality of ribs 44, illustrated in FIG. 4, the depending wall 44 defining a central chamber 46 having a top 48 in the first body 12. A passage 49 extends through the top 48. Each of the ribs 44 includes a cutout 45 adjacent the depending wall 42 for receiving the seal 24 as described below.

Figure 3:
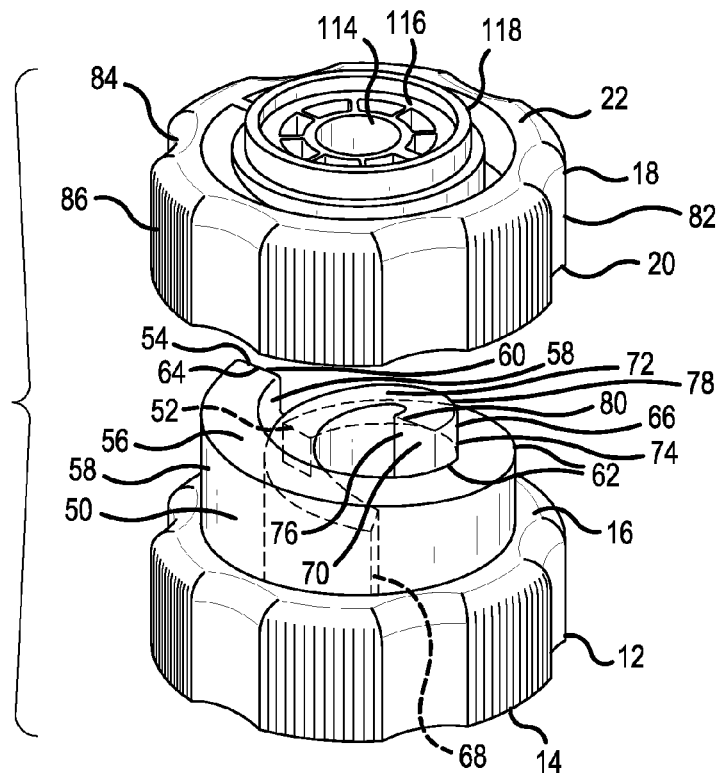
FIG. 3 is a first exploded perspective view of the two mutually rotatable bodies of FIG. 1.
Figure 4:
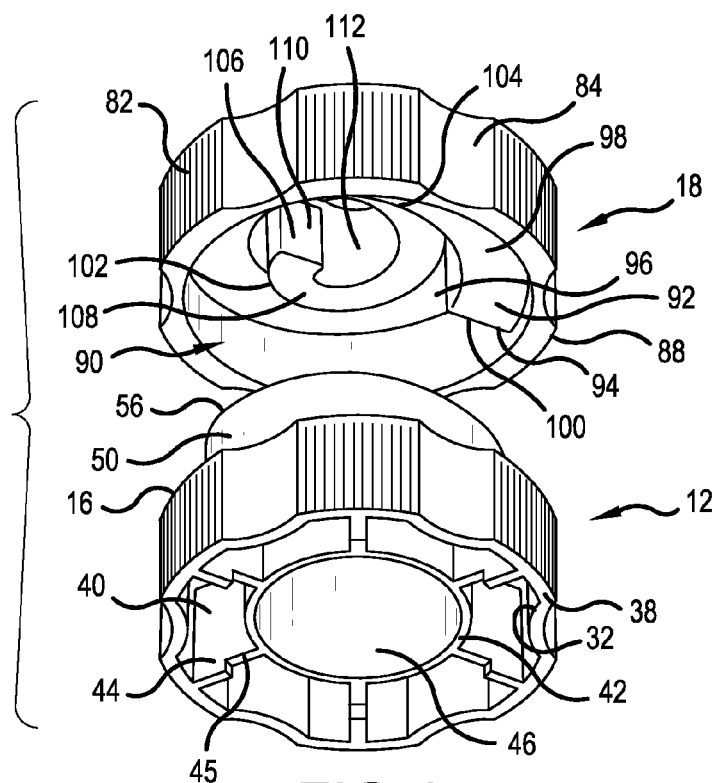
FIG. 4 is a second exploded perspective view of the mutually rotatable bodies of FIG. 1.

Referring now to FIGS. 3 and 4, a first curved wall 50 extends from the top 16 of the first body 12 and includes a first end 52, a second end 54, a top surface or ramp surface 56, first and second spaced, curved, sidewalls 58 and an end wall 60. The ramp surface 56 has first and second helical side edges 62 and an end edge 64 separating the top surface 56 from the end wall 60. A second curved wall 66 extends from the top 16 of the first body 12 inside the first curved wall 50 and includes a first end 68 a second end 70 a top or ramp surface 72, first and second spaced, curved sidewalls 74 and an end wall 76. The ramp surface 72 of the second curved wall 66 has first and second helical side edges 78 and an end edge 60 separating the top surface 72 of the second curved wall 66 from the end wall 76 of the second curved wall 66.

The second body 18 includes a generally cylindrical outer wall 82 having indentations 64 and textured portions 86 similar to those of the first body 12 that allow the second body 18 to be securely grasped or turned. The bottom 20 of the second body 18 includes a peripheral edge 88 that defines an opening, into an interior 90 of the second body 18. The interior 90 of the second body 16 includes a first ramp 92 having a first end 94, a second end 96, a bottom surface or ramp surface 98 and an end wall 100. The interior 90 of the second body 18 also includes a second ramp 102 having a first end 104, a second end 106, a bottom or ramp surface 108 and an end wall 110. The first and second ramps 92, 102 surround a central passage 112 in the second body 18 and a bore 114 in the top 22 of the second body 18. The top 22 of the second body includes a flat central portion 116 surrounding the bore 114 which flat central portion 116 is surrounded by a low wall 118.

With reference to FIG. 2, the first portion 26 of the seal 24 is a hollow, truncated cone that has a large end 120, a small end 122 and a hollow interior 123. (The first portion 26 could, alternately, have a stepped configuration and "taper" in steps rather than continuously.) The large end 120 is mounted at the bottom 14 of the first body 12 around the opening into the central chamber 46 of the first body 12 and in the cutouts 45 of the ribs 44. The cutouts 45 in the ribs 44 limit lateral movement of the first portion 26 of the seal 24 even when the seal 24 is compressed as described below. A plate 124 or spacer 124 is mounted at the small end 122 of the seal first portion 26, which spacer 124 may comprise a washer, formed of metal or another material. The spacer 124 includes a first face 126 abutting the small end 122 of the seal first portion 26, a second face 126 opposite the first face, an outer diameter approximately the same as the outer diameter of the small end 122 of the seal first portion 26 and a central hole or opening 130 having a diameter. The second portion 28 of the seal 24 is cylindrical and has a first end 132 abutting the second face 128 of the spacer 124, a hollow interior 134 and a second end 136 spaced from the spacer 124. Alternately, the second portion 28 of the seal 24 could be tapered.

The seal 24 is held against the bottom 14 of the first body 12 by the hollow shaft 30 that extends through the first and second bodies 12, 18, and through the first and second seal members 26, 28 and the spacer 124. The hollow shaft 30 has a first end portion 138 (FIG. 1) that projects away from the flat central portion 116 of the second body top 22. From the second body 18, the hollow shaft 30 extends through the bore 114 in the second body top 22, and through the central passage 112 inside the first ramp 92 and the second ramp 102. The hollow shaft 30 is secured to the bore 114 in a suitable manner, such as by adhesive (not shown) and/or a suitable interlocking fit (not shown), and/or in the manner described below, against rotation relative to the second body 18 so that the hollow shaft 30 rotates with the rotation of the second body 18. From the second body 18, the hollow shaft 30 extends through the passage 49 in the top 16 of the first body 12, through the central chamber 46 and past the bottom 14 of the first body 12, and through the interior 123 of the seal first portion 26, through the central opening 130 of the spacer 124 and through the hollow interior 134 of the seal second portion 28. The hollow shaft 30 has a second end 139 that is terminated with a flange 140, which flange 140 abuts the second end 136 of the seal second portion 28. The second end 139 of the hollow shaft 30, located between the flange 140 and the spacer 124, has a diameter greater than the width of the central opening 130 in the spacer 124 for reasons discussed below.

Figure 5:
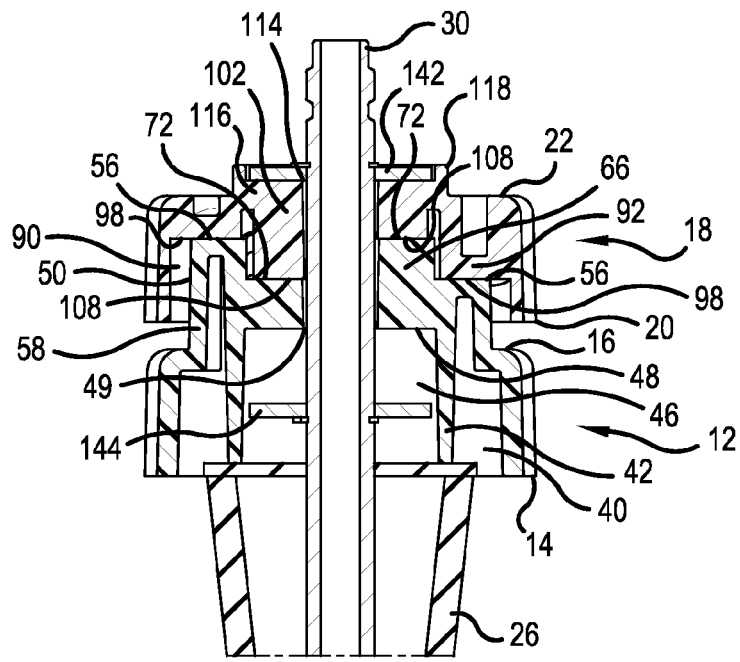
FIG. 5 is a sectional side devotional view of a portion of the adapter of FIG. 1 showing a first configuration of the adapter.
Figure 6:
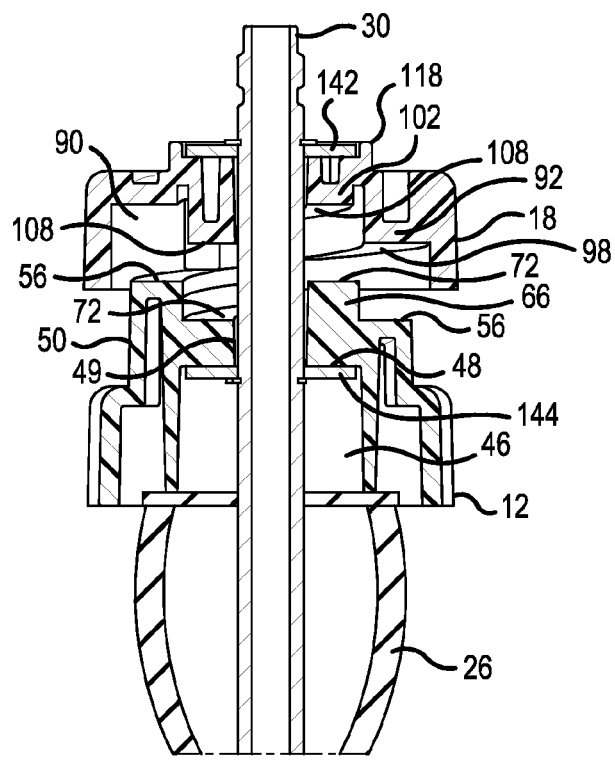
FIG. 6 is sectional side elevational view of a portion of the adapter of FIG. 1 showing a second configuration of the adapter.

As illustrated in FIGS. 5 and 6, the hollow shaft 30 also has a first disk 142 projecting perpendicularly therefrom and securely fastened thereto and mounted on the flat central portion 116 of the top 22 of the second body 18 in the space defined by the low wall 118. A secure connection between the first disk 142 and the top 22 of the second body 18 secures the hollow shaft 30 to the second body 18 and allows the hollow shaft 30 to rotate with the second body 18. The relatively large surface area of the first disk 142 provides a larger area for forming a bond with the second body 18 than the area at which the hollow shaft 30 contacts the interior of the bore 114 in the top 22 of the second body 18. Of course, the hollow shaft 30 can also be secured to the bore 114 by additional adhesive or with a mechanical interlocking arrangement as mentioned above. The hollow shaft 30 has a second disk 144 projecting perpendicularly therefrom at a location on the shaft that is inside the central chamber 46 of the first body 12. The second disk 144 limits the upward movement of the hollow shaft 30 relative to the first body 12 because the second disk 144 cannot move past the top 48 of the central chamber 46 when the hollow shaft 30 slides through the passage 49.

The adapter 10 has a storage or nonuse configuration, illustrated in FIG. 5, in which the second body 18 is mounted on the first body 12 so that the bottom surface 98 of the second body first ramp 92 rests on the top surface 56 of the first curved wall 50 and so that the bottom surface 108 of the second ramp 102 rests on the top surface 72 of the second curved wall 66 with the spaced curved sidewalls 58 of the first curved wall 50 projecting at least partially into the interior 90 of the second body 18. In this configuration, the end wall 100 of the second body first ramp 92 abuts the end wall 60 of the first curved wall 50 of the first body 12, and the end wall 110 of the second ramp 102 abuts the end wall 76 of the second curved wall 66 of the first body 12, and these abutting end walls limit relative rotation between the first body 12 and the second body 18 in a first direction. In this configuration, the second disk 144 is located in the central chamber 46 of the first body 12 at a distance from the top 48 of the central chamber 46, and the flange 140 of the hollow shaft 30 holds the seal first portion 26 and the seal second portion 28 securely against the bottom 14 of the first body 12. The length of the hollow shaft 30 is selected such that in this configuration, the seal 24 is maintained under sufficient compression to hold the seal first portion 26 and seal second portion 28 in place, but without substantially deforming either of the first and second seal portions 26, 28.

Rotating the second body 18 relative to the first body 12 moves the end wall 100 of the second body first ramp 92 away from the end wall 60 of the first curved wall 50 of the first body 12 and causes the bottom surface 98 of the first ramp 92 to slide over the top surface 56 of the first curved wall 50 and the bottom surface 108 of the second ramp 102 to slide over the top surface 72 of the second curved wall 66 of the first body 12. Because the first curved wall 50 becomes taller between its first end 52 and second end 54, the helical top surface 56 becomes increasingly distant from the top 16 of the first body between the first end 52 and the second end 54. Preferably, the height of the first wall, namely, the distance between the top surface 56 and the top 16 of the first body 12 increases at a substantially constant rate from the first end 52 of the first curved wall 50 to the second end 54 of the first curved wall 50. Similarly, the second curved wall 66 becomes taller between its first end 68 and its second end 70. The distance between the bottom surface 98 of the first ramp 92 and the top 22 of the second body 18 also increases between the first end 94 and second end 96 of the first ramp, and the distance between the bottom surface 108 of the second ramp 102 and the top 22 of the second body 18 also increases between the first end 104 and the second end 106 of the second ramp 102. The relative sliding of these oppositely facing helical surfaces (top surfaces 56 and 72 of the first body 12 and bottom surfaces 98 and 108 of the second body 18) cause the first body 12 and the second body 18 to move away from each other, specifically, causes the top 22 of the second body 12 to move away from the bottom 14 of the first body 12.

The foregoing description is of essentially, ramps on the first body, formed by the tops 58, 72 of the first and second curved walls 50, 66 and ramps on the second body 18, namely the first and second ramps 92, 102. However, it is only necessary that a ramp be formed on one of the first and second bodies 12, 18. The other body can be provided with a structure that may be described as a "ramp follower" or a structure that slides along the ramp of the other body as the first and second bodies rotate. This is because the surfaces of the ramps are only in substantially full contact in the non-use configuration. After relative rotation between the first body 12 and second body 18 begins, it is merely necessary to have a structure on the second body 18 slide along the ramp or ramps on the first body 12 or a structure on the first body 12 slide along the ramp or ramps on the second body 18. However, for ease of assembly and manufacture, and to provide stability when assembled in the non-use configuration, ramps on both the first body 12 and the second body 18 are disclosed in this embodiment. In other words, in this embodiment, the ramp follower takes the form of a ramp.

The first body 12 and the second body 18 are rotatable relative to one another from a first angular relationship, illustrated in FIG. 4, to a second angular relationship illustrated in FIG. 5, and this rotation causes the top 22 of the second body 18 to move away from the bottom 14 of the first body 12. This movement, in turn, pulls the flange 140 at the second end 139 of the hollow shaft 30 toward the bottom 14 of the first body 12 and compresses the seal 24. The compression of the seal 24 occurs in two stages, discussed below in connection with FIGS. 7 and 8.

In the present embodiment, the first and second angular relationships are separated by about one full turn or by 360°. As used herein, 0° and 360° are two different angular relationships; that is, turning one of the first body 12 and the second body 18 relative to the other body by 360° constitutes moving the bodies from a first to a second angular relationship. This use of ramps allows the first body 12 to be axially separated from the second body 18 by a distance useful for forming a seal while undergoing only approximately a single turn (about a 360° relative change in angular position). This is not possible using a screwthread having a single turn because the maximum helix angle of screwthreads allows only a small separation to be obtained with a single rotation, and thus conventional devices that use screwthreads must be turned multiple times to achieve a useful separation between two bodies.

FIG. 7 illustrates the seal second portion 28 inserted in a relatively narrow filler neck 146 of a radiator (not illustrated) with the spacer 124 resting on an end of the filler neck 146. In FIG. 7, the first body 12 and second body 18 have been rotated away from the storage configuration of FIG. 4 a sufficient angular distance to compress the second end 136 of the seal second portion 28 toward the first end 132 of the seal second portion 28 to deform the seal second portion 28 and press the outer wall of the seal second portion 28 tightly against the inside wall of the filler neck 146 to form a seal with the filler neck 146. The outer wall of the seal second portion 28 is pressed against the inside wall of the filler neck 146 with sufficient force that no fluid can pass between the seal second portion 28 and the inside of the filler neck 146. The hollow shaft 30 can be selectively blocked, for example with a suitable cap (not illustrated). Thus, in this configuration, fluid cannot pass around the outside of the adapter 10 and can only pass through the hollow shaft 30 when the hollow shaft 30 is open.

Friction between the ramp surfaces (the top surface 56 of the first curved wall 50 against the bottom surface 98 of the first ramp 92 and the top surface 72 of the second curved wall 66 and the bottom surface 108 of the second ramp 102) and the relative angles of these ramp surfaces causes the first body 12 and second body 18 to maintain a relative orientation after being rotated to this first sealing position without sliding back toward their starting relationship.

FIG. 8 illustrates the adapter 10 inserted into a filler neck 148 that is larger than the diameter of the seal second portion 28. In this case, the tapered or conical seal first portion 26 is inserted into the filler neck 148 until a sidewall of the seal first portion 26 comes into contact with the opening of the filler neck 148. The first body 12 is held in place relative to the filler neck 148, and the second body 18 is rotated relative to the first body 12 to draw the second end 139 of the shaft 30 toward the bottom 14 of the first body 12. As mentioned above, the second end portion 139 of the hollow shaft 30 has a diameter larger than the width of the central opening 130 in the spacer 124. The seal second portion 28 of the seal 24 is also more readily deformed than the first portion 26 of the seal. Therefore, when the first body 12 and the second body 18 are first rotated away from the storage configuration described above, substantially all deformation of the seal 24 occurs in the seal second portion 28. This deformation continues until the second portion 139 of the hollow shaft 30 reaches the central opening 130 of the spacer 124, after which further upward force is applied against the spacer 124 and the small end 122 of the seal first portion 26 to compresses the seal first portion 26. The seal first portion 26 may be slightly deformed as the seal second portion 28 is compressed, but most of the deformation occurs in the seal second portion 28 until the second end portion 139 of the hollow shaft 30 reaches the central opening 130 in the spacer 124. Continued rotation of the second body 18 relative to the first body 12 pulls the spacer 124 and the small end 122 of the seal first portion 26 toward the bottom 14 of the first body 12 and causes the seal first portion 26 to bulge outwardly and press the outer wall of the seal first portion 26 tightly against the interior wall of the filler neck 148 to form a seal therewith that substantially prevents the passage of fluid between the outer wall of the seal first portion 26 and the inside of the large filler neck 148. Once sealed in the small filler neck 146 or the large filler neck 148, air can be removed from the radiator connected to one of the filler necks 146, 148, in a conventional manner with the seal formed between the seal 24 and the interior of the small filler neck 146 or the large filler neck 148 being sufficient to maintain a partial vacuum in the radiator.

Upward movement of the hollow shaft 30 relative to the first body 12 is limited by the second disk 144 which cannot move past the top 48 of the central chamber 46 of the first body 12. This prevents the second body 18 from being removed from the first body 12 and also limits the degree to which the seal first portion 26 can be compressed to reduce the likelihood of damaging the seal 24 by over compression. However, movement between the first body 12 and the second body 18 in a direction along the longitudinal axis of the hollow shaft 30 is not otherwise limited, and the first and second bodies 12, 18 are not interlocked as they would be if they were connected with screwthreads. In other words, the first body 12 and the second body 18 could be pulled away from one another without relative rotation if sufficient force were applied.

Figure 9:
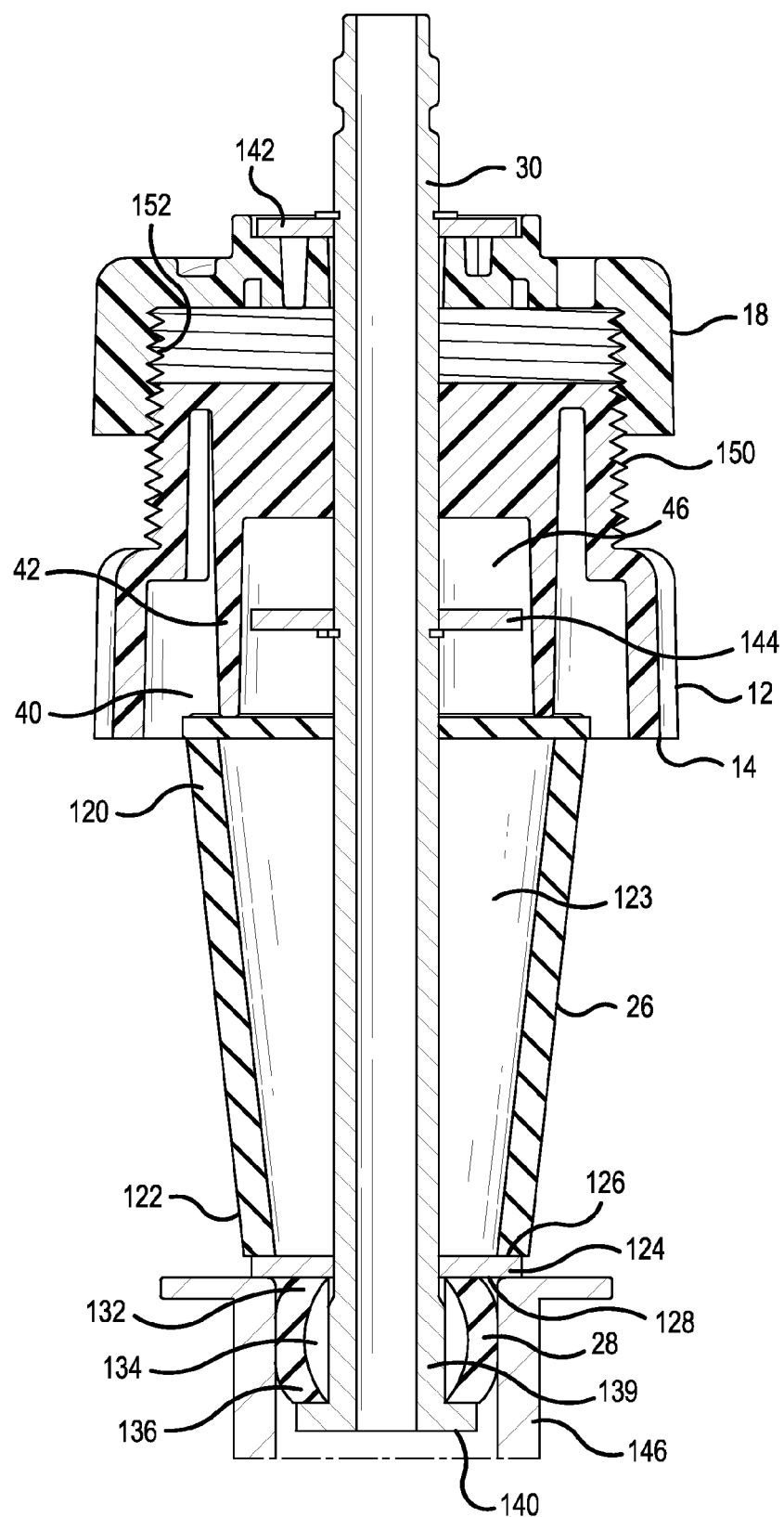
FIG. 9 is a sectional side devotional view of an adapter according to another embodiment, which includes a seal having a cone-shaped portion and a cylindrical portion, with the cylindrical portion inserted into a small tube and forming a seal with the interior of the small tube.
Figure 10:
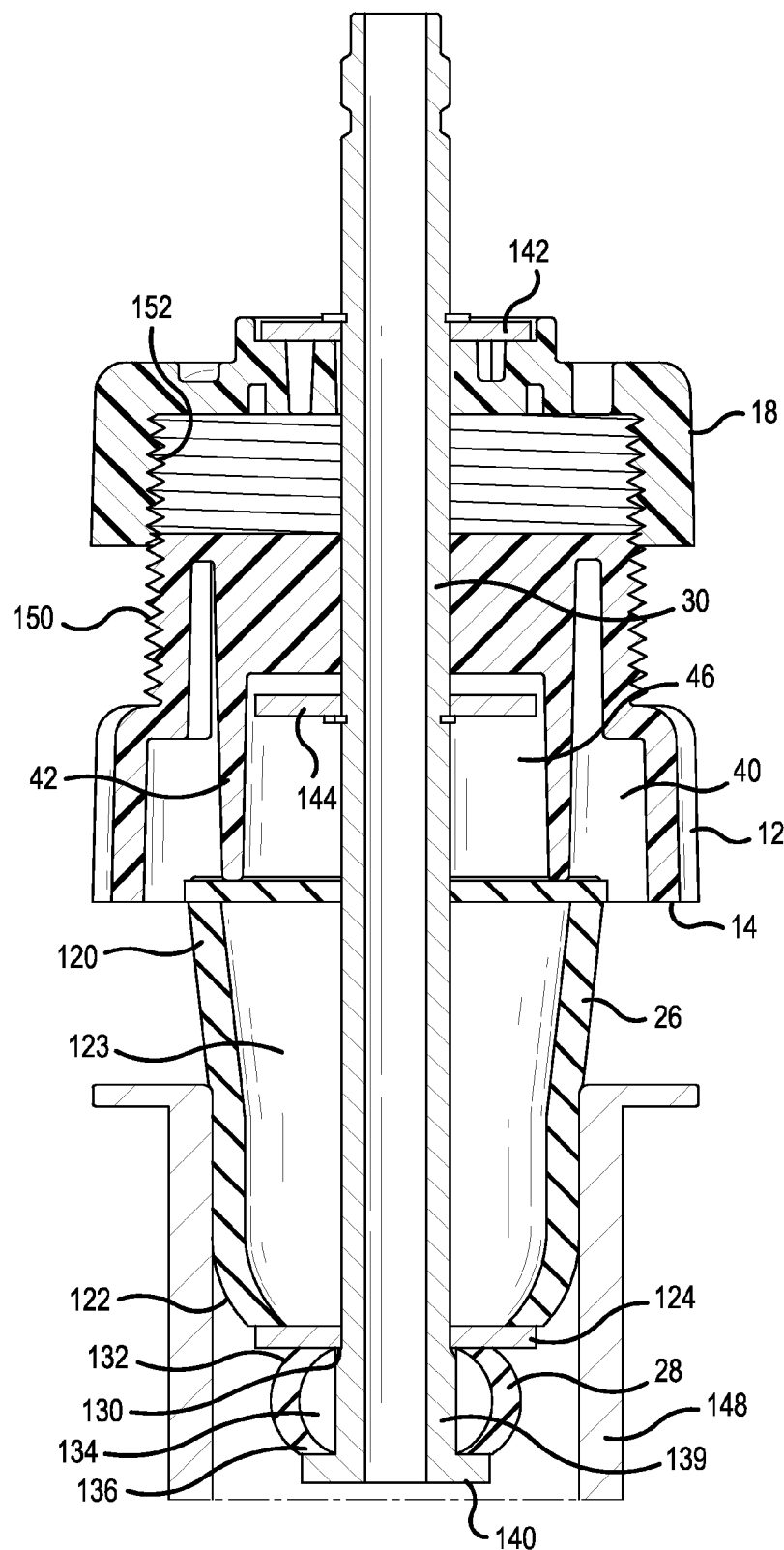
FIG. 10 is a sectional side elevational view of the adapter of FIG. 9 with the tapered or cone-shaped portion of the seal inserted into a large tube and forming a seal with the interior of the large tube.

The two-part compressible seal 24 described above can also be used without the ramp arrangement described above if a different structure is provided for moving the hollow shaft 30 relative to the first body 12. For example, FIG. 9 illustrates another embodiment of the invention in which the first body 12 has external screwthreads 150 which engage internal screwthreads 152 on the second body 18. The first body 12 and second body 18 can be moved toward each other by rotating them in a first direction and away from each other by rotating them in a second direction. Thus, unscrewing the second body 18 relative to the first body 12 pulls the flange 140 of the hollow shaft 30 toward the first body 12 and compresses the compressible seal 24 as described above. FIG. 9 shows the device of this embodiment forming a seal with the relatively small radiator filler neck 146, and FIG. 10 shows the device of this embodiment forming a seal with the relatively large radiator filler neck 148. The seal is formed in exactly the same manner described above, but a different mechanism is used to move the hollow shaft 30 relative to the first body 12 than in the first embodiment.

It is intended that the inventive two-part seal 24 of this embodiment can be used with any other mechanism for moving the hollow shaft 30 relative to the first body 12 including, without limitation, a ballnut/ballscrew arrangement not illustrated) with a ballnut surrounding a portion of the hollow shaft and being rotated by the second body 18 or a lever arm (not illustrated) for pulling the hollow shaft 30 in a linear direction along its longitudinal axis without the need for relative rotation between two parts. Substantially any device for moving the hollow shaft 30 relative to the first body 12 can thus allow the benefits of the disclosed two-part compressible seal 24 to be obtained.

The present invention has been described herein in terms of presently preferred embodiments. Modifications and/or additions to these embodiments will become apparent to persons of ordinary skill in the art upon a reading of the foregoing description. It is intended that all such modifications and additions form a part of the present invention to the extent they fall within the scope of the several claims appended hereto.

What is claimed is:

1. An adapter configured to be mounted in an opening to form a seal with an interior wall of the opening, the adapter comprising:
    a first body;
    a second body rotatably mounted to the first body;
    a compressible seal extending from the first body, the compressible seal including a compressible seal first portion, the compressible seal first portion having a first end at the first body, a second end and an interior, the compressible seal further including a plate having a hole at the second end of the compressible seal first portion, and a compressible seal second portion having a first end at the plate and a second end and having an interior, and
    a hollow shaft operably connected to the second body and having a longitudinal axis and a shaft first end at the second body and a shaft second end, the shaft projecting through a passage in the first body, through the interior of the first portion of the compressible seal, through the hole in the plate, and into the interior of the second portion of the compressible seal, the shaft having a shoulder in the interior of the second portion of the compressible seal, the shoulder being spaced from the plate and spaced from the second end of the compressible seal second portion, and a width of the shaft at the shoulder being greater than a width of the hole in the plate,
    wherein the first body includes a first screwthread, the second body includes a second screwthread engaging the first screwthread and wherein rotating the first body relative to the second body screws the first body to or unscrews the first body from the second body and moves the shaft in an axial direction relative to the first body.

2. The adapter of claim 1, wherein the shaft second end includes a flange overlying the second end of the compressible seal second portion.

3. The adapter of claim 1, wherein the compressible seal first portion is shaped as a truncated cone and wherein an exterior diameter of the first end of the compressible seal first portion is greater than an exterior diameter of the second end of the compressible seal first portion.

4. The adapter of claim 3, wherein the compressible seal second portion is cylindrical.

5. The adapter of claim 4, wherein the plate comprises a spacer formed from a material different than a material of the first portion and different than a material of the second portion, the spacer spacing the compressible seal first portion from the compressible seal second portion.

6. The adapter of claim 1, wherein the shaft first end is fixed to the second body.

7. The adapter of claim 1, wherein the shaft is operably connected to the second body such that rotating the second body relative to the first body moves the shaft in an axial direction relative to the first body.

8. The adapter of claim 1,
    wherein the shaft second end includes a flange overlying the second end of the compressible seal second portion,
    wherein the compressible seal first portion is shaped as a truncated cone and an exterior diameter of the first end of the compressible seal first portion is greater than an exterior diameter of the second end of the compressible seal first portion, and
    wherein the compressible seal second portion is cylindrical.

9. The device of claim 1, wherein the shaft is shiftable from a first position in which the shoulder is spaced from the plate to a second position in which the shoulder contacts the plate, wherein the shoulder contacting the plate in the second position substantially sets a minimum separation between the first end of the compressible seal second portion and the second end of the compressible seal second portion, the shoulder being spaced from the first body by a first distance when the shaft is in the second position, and wherein the shaft is shiftable to a third position in which the shoulder is spaced from the first body by a second distance less than the first distance.

10. A device for at least partially blocking an opening comprising:
    a first body;
    a compressible seal extending from the first body, the compressible seal including a first portion having a first end at the first body and a second end spaced from the first body and a wall having an opening at the second end of the first portion, the compressible seal further comprising a second portion having a second portion first end at the first portion second end and a second portion second end, and
    a shaft having a first end and a second end and a longitudinal axis, the shaft extending through the first body, extending through the first portion of the compressible seal and through the opening in the wall and into the second portion of the compressible seal, the shaft having a first part configured to move freely through the opening in the wall and a second part too large to pass through the opening in the wall, the second part being located in the compressible seal second portion, and the shaft being configured to support the compressible seal second portion,
    wherein, shifting the shaft second end a first amount toward the first body moves the shaft first part through the opening in the wall and pulls the compressible seal second portion second end toward the compressible seal second portion first end and radially bulges the compressible seal second portion, and wherein shifting the shaft second end further toward the first body pulls the shaft second part against the wall having the opening and pulls the wall having the opening toward the first body and radially bulges the compressible seal first portion.

11. The device of claim 10, including a second body rotatably mounted to the first body, wherein the shaft is operably connected to the second body such that rotating the second body relative to the first body moves the shaft in the direction of the shaft longitudinal axis relative to the first body.

12. The device of claim 11, wherein the shaft first end is fixed to the second body.

13. The device of claim 12, wherein the first body includes a first screwthread, the second body includes a second screwthread engaging the first screwthread and wherein rotating the first body relative to the second body screws the first body to or unscrews the first body from the second body and moves the shaft in an axial direction relative to the first body.

14. The device of claim 10, wherein the first portion of the compressible seal is tapered and the second portion of the compressible seal is cylindrical.

15. The device of claim 10, wherein the shaft is hollow and wherein the shaft second end includes a flange overlying the second end of the compressible seal second portion.

16. The device of claim 10, wherein the shaft is hollow and wherein the device comprises an adapter for connecting a passage external to the device to the opening.

17. The device of claim 10, wherein shifting the shaft second end further toward the first body radially bulges the compressible seal first portion without further compressing the compressible seal second portion.

18. A device for at least partially blocking an opening comprising:
a first body;
a second body rotatably mounted to the first body;
a compressible seal extending from the first body, the compressible seal including a compressible seal first portion, the compressible seal first portion having a first end at the first body, a second end and an interior, the compressible seal further including a plate having a hole at the second end of the compressible seal first portion, and a compressible seal second portion having a first end at the plate and a second end and having an interior, and
a hollow shaft operably connected to the second body and having a longitudinal axis and a shaft first end at the second body and a shaft second end, the shaft projecting through a passage in the first body, through the interior of the first portion of the compressible seal, through the hole in the plate, and into the interior of the second portion of the compressible seal, the shaft having a shoulder in the interior of the second portion of the compressible seal, the shoulder being spaced from the plate spaced from the second end of the compressible seal second portion, and a width of the shaft at the shoulder being greater than a diameter of the hole in the plate,
wherein the compressible seal first portion is shaped as a truncated cone and wherein an exterior diameter of the first end of the compressible seal first portion is greater than an exterior diameter of the second end of the compressible seal first portion.

19. The device of claim 18, wherein the shaft second end includes a flange overlying the second end of the compressible seal second portion.

20. The device of claim 18, wherein the compressible seal second portion is cylindrical.

21. The device of claim 18, wherein the hollow shaft is shiftable from a first position in which the shoulder is spaced from the plate to a second configuration in which the shoulder contacts the plate, wherein the shoulder contacting the plate substantially sets a minimum separation between the first end of the compressible seal second portion and the second end of the compressible seal second portion, the shoulder being spaced from the first body by a first distance when the shaft is in the second position, and wherein the shaft is shiftable to a third position in which the shoulder is spaced from the first body by a second distance less than the first distance.

* * * * *